US006695737B2

United States Patent
Park et al.

(10) Patent No.: US 6,695,737 B2
(45) Date of Patent: Feb. 24, 2004

(54) LINE PRESSURE REGULATING SYSTEM FOR AN AUTOMATIC TRANSMISSION

(75) Inventors: Jong-Sool Park, Suwon (KR); Chang-Wook Lee, Yongin (KR); Jae-Duk Jang, Yongin (KR); Tae-Kyun Kim, Yongin (KR); Jin-Hee Lee, Yongin (KR); Hyun-Soo Shim, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/033,334

(22) Filed: Dec. 26, 2001

(65) Prior Publication Data

US 2002/0082131 A1 Jun. 27, 2002

(30) Foreign Application Priority Data

Dec. 27, 2000 (KR) ........................................ 2000-82952

(51) Int. Cl.[7] .............................................. F16H 31/00
(52) U.S. Cl. ................... 475/127; 137/625.64
(58) Field of Search ................. 475/127, 128, 475/130, 131; 477/127, 138, 163, 164; 192/3.29, 3.3, 3.33, 3.58, 109 F, 85 R; 137/625.6, 625.64

(56) References Cited

U.S. PATENT DOCUMENTS

| 3,053,051 A | * | 9/1962 | Kelley ........................... 60/329 |
| 3,747,439 A | * | 7/1973 | Uozumi et al. .............. 477/150 |
| 4,718,308 A | * | 1/1988 | Haley ............................ 477/39 |
| 5,513,732 A | * | 5/1996 | Goates ......................... 192/3.3 |
| 5,571,248 A | * | 11/1996 | Seetharaman et al. . 137/625.65 |
| 5,816,977 A | * | 10/1998 | Yasue et al. .................. 477/138 |
| 5,860,886 A | * | 1/1999 | Kim ............................... 475/128 |
| 6,044,645 A | * | 4/2000 | Greenan et al. ............... 60/337 |
| 6,159,124 A | * | 12/2000 | Redinger et al. ............ 475/131 |
| 6,171,211 B1 | * | 1/2001 | Ortmann et al. .............. 477/62 |

* cited by examiner

Primary Examiner—Richard M. Lorence
Assistant Examiner—David D. Le
(74) Attorney, Agent, or Firm—Pennie & Edmonds LLP

(57) ABSTRACT

A line pressure regulating system for an automatic transmission comprises a regulator valve that regulates a line pressure by being provided with a hydraulic pressure from an oil pump, wherein the regulator valve is controlled such that a resultant force of a variable control pressure and an elastic member makes an equilibrium with a resultant force of the line pressure and a range pressure that is provided in all ranges except the R range.

17 Claims, 1 Drawing Sheet

LINE PRESSURE REGULATING SYSTEM FOR AN AUTOMATIC TRANSMISSION

BACKGROUND OF THE INVENTION

The present invention relates to a regulating system for an automatic transmission, and more particularly, to a line pressure regulating system in which a minimum amount of lubrication oil is provided to the automatic transmission by generating line pressure even in P or N ranges.

Generally, while an engine is operating, an automatic transmission generates line pressure and provides lubrication oil regardless of a manual valve position.

However, because the order of the position of the manual valve range is P, R, N, D, 3, 2 and L, or P, R, N, D, 2 and L, that is, R range is located between the P and N ranges, it can be difficult to generate a required line pressure in P and N ranges. Thus, there have been line pressure regulating systems in which the line pressure is not generated in the P range. However, in this case, if a vehicle stops for a long time with an engine operating, rotating parts of the transmission are abraded because of lack of lubrication oil. Therefore, automatic transmissions generate line pressure even in the P or N ranges, so that a minimum amount of lubrication oil is provided to the automatic transmission.

As shown in FIG. 1, the aforementioned conventional line pressure regulating system comprises a regulator valve 10 that regulates the line pressure. The regulator valve 10 comprises a valve body 11, a first valve spool 13, a second valve spool 15, an elastic member 17 and plugs 19. The first and second valve spools have different sectional areas.

The first valve spool 13 is provided with a first land 21 on which variable control pressure (Pa) regulated by a solenoid valve 40 acts, and a second land 23 on which R range pressure (Pb) transmitted from the manual valve 20 acts, a sectional area of which is larger than that of the first land 21.

The first valve spool 13 is installed within the valve body 11 by interposing the plugs 19 between the valve body 11 and the first and second lands respectively.

The second valve spool 15 is provided with a first land 25, a second land 27, a third land 29 and a fourth land 31. The second valve spool 15 is elastically supported by the elastic member 17 such that a force of the elastic member acts on the second valve spool 15 to force it to the right as shown in FIG. 1.

The first land 25 regulates a torque converter pressure (Pd) by controlling an exit of pressurized oil provided from an oil pump 30. The second land 27 and the third land 29 cooperatively control the line pressure (Pc) by regulating an amount of exhausted oil (EX). The line pressure (Pc) always acts on the fourth land 31.

The first, second and third lands of the second valve spool have the same sectional area, and a sectional area of the fourth land is smaller than that of the first, second and third lands.

Therefore, in the ranges except the R range, a resultant force of the variable control pressure (Pa) which acts on the first land 21 of the first valve spool 13 and the elastic member 17 makes an equilibrium with a force that is generated by the line pressure (Pc) and acts on the fourth land 31 of the second valve spool 15. The line pressure (Pc) generated in this way provides lubrication oil not only in the D, 3, 2 and L ranges but also in the P and N ranges.

In the R range, a resultant force of the variable control pressure (Pa), a force that is generated by the R range pressure (Pb) and acts on the second land 23 of the first valve 13, and a force generated by the elastic member 17 makes an equilibrium with a force generated by the line pressure (Pc).

Because the range pressure is generated in the R range, the line pressure (Pc) increases in the R range.

However, the aforementioned conventional line pressure regulating system for the automatic transmission has a problem in that if the variable control pressure (Pa) and the line pressure (Pc) acts respectively on the first land 21 of the first valve spool 13 and the fourth land 31 of the second valve spool 15 in opposite directions when an engine starts or the pressure changes rapidly, the first and second valve spools collide with each other and vibrate. Consequently, the line pressure becomes unstable.

In addition, because the above conventional line pressure regulating system uses the first valve spool comprising the first and second lands that have different sectional areas and the plugs corresponding to the first valve spool, the system becomes complicated and therefore the cost of production increases. Moreover, because the first and second valve spools and several exhaust ports are needed, length of the system increases, and consequently a degree of freedom of design becomes restricted.

SUMMARY OF THE INVENTION

It is one object of the present invention to provide a line pressure regulating system for an automatic transmission in which a generation of line pressure is stable, and a structure of which is simple so that a length of the system can be shortened.

The line pressure regulating system of the present invention comprises the regulator valve, in which a resultant force of the variable control pressure and the elastic member creates an equilibrium with a counterpart resultant force of the line pressure and the P, N, D, 3, 2 and L range pressure such that the line pressure can be controlled to be pertinent to each range.

In a preferred embodiment of the invention, a method for regulating line pressure includes steps of providing hydraulic line pressure to the regulator valve on a first side of a valve spool, a range pressure to the regulator valve also on the first side of the valve spool, and a variable control pressure to the regulator valve on a second, opposite side of the valve spool. In addition, a separate biasing force is provided acting on the valve spool along with said the control pressure. The regulator valve is controlled to reach equilibrium between a resultant force from the variable control pressure and biasing force and a resultant force from the hydraulic line pressure and the range pressure for all ranges of the transmission except the reverse range. In alternative embodiments all range pressures except the reverse range pressure are provided from a manual valve, either from the neutral port or the drive port of the valve.

In an alternative embodiment of the invention, a line pressure regulating system for an automatic transmission, includes a regulator valve that regulates a line pressure in each range of the transmission, a solenoid valve, an oil pump and a manual valve. The regulator valve comprises a valve body defining a plurality of input and output ports, a valve spool disposed within the valve body, and a biasing element disposed within the valve body and acting on the valve spool in a first direction. The solenoid valve controls a variable control pressure at a first entry port acting in concert with the biasing element. The oil pump provides line pressure at a second entry port acting against the biasing element. The manual valve controls range pressure at a another entry port also acting against the biasing element.

DETAILED DESCRIPTION OF THE PREFERRED EMBODIMENTS

Hereinafter, a preferred embodiment of the present invention will be described in detail with reference to the accompanying drawings.

Figure 1:
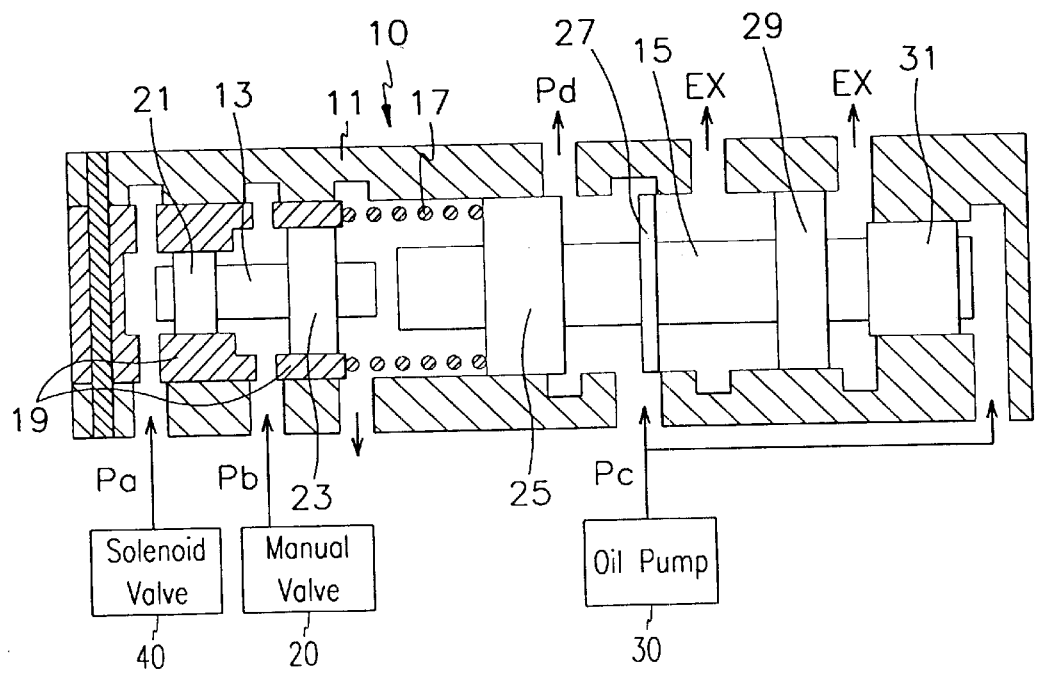
FIG. 1 is a schematic view of a conventional line pressure regulating system for an automatic transmission.
Figure 2:
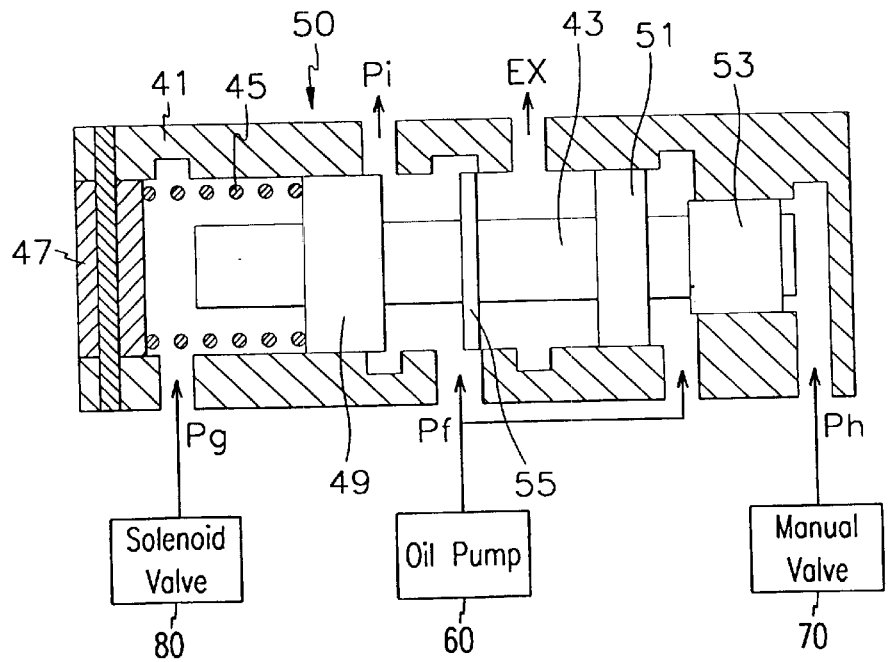
FIG. 2 is a schematic view of a line pressure regulating system according to the present invention.

As shown in FIG. 2, the line pressure regulating system according to a preferred embodiment of the invention comprises a regulator valve 50, being provided with hydraulic pressure from an oil pump 60, that regulates the line pressure to a required level in each range.

The oil pump 60 is operated the moment an engine (not shown in the drawing) operates, and it continuously generates hydraulic pressure while the engine operates.

The regulator valve 50 comprises a valve body 41, a valve spool 43, a fixed end cap 47 and an elastic member 45 (for example a spring) that is interposed between the fixed end cap 47 and the valve spool 43. The fixed end cap 47 can be substituted with an adjustable end cap with an adjusting screw so as to change the force generated by the elastic member 45. The valve spool 43 is provided with a first land 49, a second land 51, a third land 53 and a fourth land 55.

A variable control pressure Pg is preferably controlled by a solenoid valve 80. The variable control pressure Pg is introduced into the regulator valve 50. The line pressure acting on the second land 51 is provided by the oil pump such that the line pressure Pf is always present while the oil pump operates. The line pressure Pf provided between the second land 51 and the third land 53, simultaneously acts on the second land 51 in the leftward direction (in the drawing) and on the third land 53 in the rightward direction (in the drawing). However, the area of the second land 51 is larger than that of the third land 53, and therefore a net force by the line pressure acts in the leftward direction (in the drawing).

The regulator valve 50 is designed such that the resultant force of the variable control pressure Pg and the elastic member 45 are in equilibrium with the resultant force of the line pressure Pf and the range pressure Ph. The variable control pressure Pg and the force generated by the elastic member act on the first land in the rightward direction (in the drawing), and the line pressure Pf and the range pressure Ph respectively act on the second land 51 and the third land 53 in the leftward direction (in the drawing).

The range pressure Ph is provided by a manual valve 70, and it is provided in all ranges except the R range. The range pressure Ph is freely determined in accordance with a structure of the manual valve 80. Therefore, the range pressure Ph can be provided by an N range port (not shown in the drawing) and the range pressure Ph can be provided by a D range port (not shown in the drawing) of the manual valve 70. Because the variable control pressure Pg can be controlled to be reduced even when the range pressure Ph is not provided in the P and N ranges, it is also possible that the range pressure Ph is cut off in the P and N ranges and connected in the D, 3, 2 and L ranges.

The variable control pressure Pg and the force caused by the elastic member 45 act on the first land 49 in the rightward direction (in the drawing). Contrarily, the line pressure Pf acts on the second land 51 in the leftward direction (in the drawing). The range pressure Ph operates on the third land 53 in the same direction as the line pressure Pf, and in the R range the range pressure is not provided. The fourth land 55 is provided between the first and second lands such that it controls a torque converter control pressure Pi in cooperation with the first land 49, and also controls an exhaust EX of the line pressure Ph in cooperation with the second land 51.

The first, second and fourth lands have the same sectional areas, and that of the third land is smaller than those of the first, second and fourth lands.

A line pressure regulating process according to the invention using the above stated line pressure regulating system will now be explained.

In all ranges except the R range, the resultant force of the variable control pressure Pg and the elastic member 45 respectively acting on the first land 49 are in equilibrium with the resultant force of the line pressure Pf acting on the second land 51 and the range pressure Ph acting on the third land 53. The line pressure Pf regulated in this way provides lubrication oil not only in D, 3, 2 and L ranges, but also in P and N ranges.

In the R range, because the regulator is not provided with the range pressure, the resultant force of the variable control pressure Pg and the elastic member 45 respectively acting on the first land 49 reach equilibrium with the line pressure Pf acting on the second land 51. Therefore, the line pressure Pf is relatively high in the R range compared with the other ranges.

In the preferred embodiment of the present invention, the valve spool 43 is formed unitarily, and therefore a collision between the valve spools does not occur, and the structure of the regulator valve 50 also becomes simple. Consequently, the line pressure is stable, the structure is simple and the length of the system is short so that the degree of freedom of design increases.

While the present invention has been described in detail with reference to the preferred embodiment, those skilled in the art will appreciate that various modifications and substitutions can be made thereto without departing from the sprit and scope of the present invention as set forth in the appended claims.

What is claimed is:

1. A method for regulating line pressure with a regulator valve in an automatic transmission, wherein said transmission includes a plurality of ranges including at least a drive range, a neutral and a reverse range, said method comprising:

providing hydraulic line pressure to the regulator valve on a first side of a valve spool;

providing a range pressure to the regulator valve on the first side of the valve spool;

providing a variable control pressure to the regulator valve on a second, opposite side of the valve spool;

providing a separate biasing force on the valve spool acting with said variable control pressure;

controlling the regulator valve to reach equilibrium between a resultant force of said variable control pressure and biasing force and a resultant force of the hydraulic line pressure and the range pressure for all ranges of the transmission except the reverse range.

2. The method according to claim 1, further comprising controlling the variable control pressure with a solenoid valve.

3. The method according to claim 1, wherein all range pressures except the reverse range pressure are provided from a manual valve.

4. The method according to claim 3, comprising providing all range pressures except the reverse range pressure from a neutral port of the manual valve.

5. The method according to claim 3, comprising providing all range pressures except the reverse range pressure from a drive range port of the manual valve.

6. A line pressure regulating system for an automatic transmission, comprising:
   a regulator valve that regulates a line pressure in each range of the transmission, said regulator valve comprising
   a valve body defining a plurality of input and output ports,
   a valve spool disposed within the valve body, and
   a biasing element disposed within the valve body and acting on the valve spool in a first direction;
   a solenoid valve controlling variable control pressure at a first said port acting in concert with the biasing element;
   an oil pump providing line pressure at a second port acting against said biasing element; and
   a manual valve controlling range pressure at a port acting against said biasing element.

7. The line pressure regulating system of claim 6, wherein the valve spool comprises:
   a first land on which the variable control pressure and a biasing force from the biasing element act in the first direction;
   a second land on which the line pressure acts in an opposite direction of the first direction;
   a third land on which the range pressure acts in the same direction of the line pressure; and
   a fourth land that controls a torque converter control pressure in cooperation with the first land, and an exhaust of the line pressure in cooperation with the second land.

8. The line pressure regulating system of claim 7 wherein the first, second and fourth lands have the same sectional areas and the third land has a smaller sectional area than the first, second and fourth lands such that the line pressure can be increased in a reverse range of the transmission range.

9. The line pressure regulating system of claim 7 wherein the line pressure is provided with hydraulic pressure from the oil pump such that the line pressure is always present while the oil pump operates.

10. The line pressure regulating system of claim 6, wherein the regulator valve includes a single, unitary valve spool.

11. A line pressure regulating valve that regulates a line pressure in each range of an automatic transmission, said regulator valve comprising:
    a valve body defining a plurality of input and output ports, where said body has a body first end and a body second end;
    a valve spool disposed within the valve body, where said valve spool has a valve spool first end near said body first and a valve spool second end near said body second end;
    a first land coupled to said valve spool near said valve spool first end;
    a second land coupled to said valve spool between said first land and said valve spool second end;
    a third land coupled to said valve spool between said second land and said valve spool second end;
    a biasing element disposed within the valve body between said body first end and said first land, where said biasing element acts against said first land in a first direction;
    a solenoid valve controlling variable control pressure between said body first end and said first land, where said variable control pressure acts in concert with the biasing element against said first land;
    an oil pump providing line pressure between said second land and said third land, where said line pressure acts against said second land in a second direction opposing said first direction; and
    a manual valve controlling range pressure between said body second end and said third land, where said range pressure acts against said third land in said second direction.

12. The line pressure regulating valve of claim 11, wherein said third land has a differential area to said first, second, and forth lands.

13. The line pressure regulating valve of claim 11, further comprising:
    a fourth land coupled to said valve spool between said first land and said second land, wherein said line pressure is also supplied between said first and forth lands.

14. The line pressure regulating valve of claim 11, wherein said range pressure is supplied for all ranges of the transmission except the reverse range.

15. The line pressure regulating valve of claim 11, wherein the first, second and fourth lands have the same sectional areas and the third land has a smaller sectional area than the first, second and fourth lands such that the line pressure can be increased in a reverse range of the transmission range.

16. The line pressure regulating valve of claim 11, wherein the line pressure is provided with hydraulic pressure from the oil pump such that the line pressure is always present while the oil pump operates.

17. The line pressure regulating valve of claim 11, wherein said valve spool is a single unitary valve spool.

* * * * *